(12) United States Patent
Nakagawa

(10) Patent No.: US 11,423,707 B2
(45) Date of Patent: Aug. 23, 2022

(54) IN-VEHICLE DEVICE AND VEHICLE INFORMATION COLLECTION SYSTEM

(71) Applicant: TOYOTA JIDOSHA KABUSHIKI KAISHA, Toyota (JP)

(72) Inventor: Hiroto Nakagawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 16/669,582

(22) Filed: Oct. 31, 2019

(65) Prior Publication Data

US 2020/0175784 A1 Jun. 4, 2020

(30) Foreign Application Priority Data

Dec. 4, 2018 (JP) .............................. JP2018-227362

(51) Int. Cl.
*G07C 5/00* (2006.01)
*G08G 1/16* (2006.01)
(Continued)

(52) U.S. Cl.
CPC ............. *G07C 5/008* (2013.01); *G07C 5/085* (2013.01); *G07C 5/0808* (2013.01); *G08G 1/163* (2013.01); *H04L 47/2433* (2013.01); *H04L 67/10* (2013.01); *H04L 67/12* (2013.01); *H04W 4/02* (2013.01)

(58) Field of Classification Search
CPC ...... G07C 5/008; G07C 5/085; G07C 5/0808; G08G 1/163; H04L 67/12; H04L 67/10; H04L 47/2433; H04L 67/2852; H04L 67/2842; H04L 67/2857; H04L 67/06; H04W 4/02; H04W 4/48; H04W 4/44
See application file for complete search history.

(56) References Cited

U.S. PATENT DOCUMENTS

2018/0160299 A1  6/2018  Onishi et al.
2019/0182275 A1* 6/2019  Ando ................ G06F 11/3476

FOREIGN PATENT DOCUMENTS

CN      109643268 A    4/2019
JP      2011-230633 A  11/2011
(Continued)

*Primary Examiner* — Michael V Kerrigan
(74) *Attorney, Agent, or Firm* — Oblon, McClelland, Maier & Neustadt, L.L.P.

(57) ABSTRACT

An in-vehicle device includes: an information receiving portion configured to receive request information for an external server to request transmission of pieces of vehicle information via a communication network; an information collection portion configured to collect the pieces of vehicle information from devices in a vehicle based on the request information received by the information receiving portion; an information accumulation portion configured to accumulate, in a memory, the pieces of vehicle information collected by the information collection portion; and an information transmission portion configured to transmit the pieces of vehicle information accumulated in the memory to the external server, wherein, when a remaining capacity of the memory becomes smaller than a threshold, the information accumulation portion accumulates, in the memory, vehicle information with a high priority by removing vehicle information with a low priority from the pieces of vehicle information.

14 Claims, 9 Drawing Sheets

(51) Int. Cl.
*H04L 67/12* (2022.01)
*H04W 4/02* (2018.01)
*G07C 5/08* (2006.01)
*H04L 67/10* (2022.01)
*H04L 47/2425* (2022.01)

(56) References Cited

FOREIGN PATENT DOCUMENTS

| | | |
|---|---|---|
| JP | 2014-153198 A | 8/2014 |
| JP | 2017-007405 A | 1/2017 |
| JP | 2018-092472 A | 6/2018 |
| WO | WO 2015/002026 A1 | 1/2015 |
| WO | 2018/037708 A1 | 3/2018 |

* cited by examiner

FIG. 4

FIRST TABLE T1

| # | IDENTIFICATION NUMBER | SERVICE A | SERVICE B | SERVICE C | ... |
|---|---|---|---|---|---|
| 1 | X | CONTRACTED | CONTRACTED | UNCONTRACTED | ... |
| 2 | Y | CONTRACTED | CONTRACTED | UNCONTRACTED | ... |
| 3 | Z | UNCONTRACTED | UNCONTRACTED | CONTRACTED | ... |
| ... | ... | ... | ... | ... | ... |

FIG. 5

| SECOND TABLE T2 | | | | | |
|---|---|---|---|---|---|
| # | SERVICE NAME | VEHICLE INFORMATION 1 | VEHICLE INFORMATION 2 | VEHICLE INFORMATION 3 | ... |
| 1 | SERVICE A | NECESSARY | NECESSARY | UNNECESSARY | ... |
| 2 | SERVICE B | UNNECESSARY | NECESSARY | NECESSARY | ... |
| 3 | SERVICE C | NECESSARY | UNNECESSARY | NECESSARY | ... |
| ... | ... | ... | ... | ... | ... |

FIG. 6

THIRD TABLE T3

| # | IDENTIFICATION NUMBER | TARGET FOR RECONSTRUCTION OF TRANSMISSION FILE |
|---|---|---|
| 1 | X | FIRST PROCESS A1 |
| 2 | Y | SECOND PROCESS A2 |
| 3 | Z | THIRD PROCESS A3 |
| ... | ... | ... |

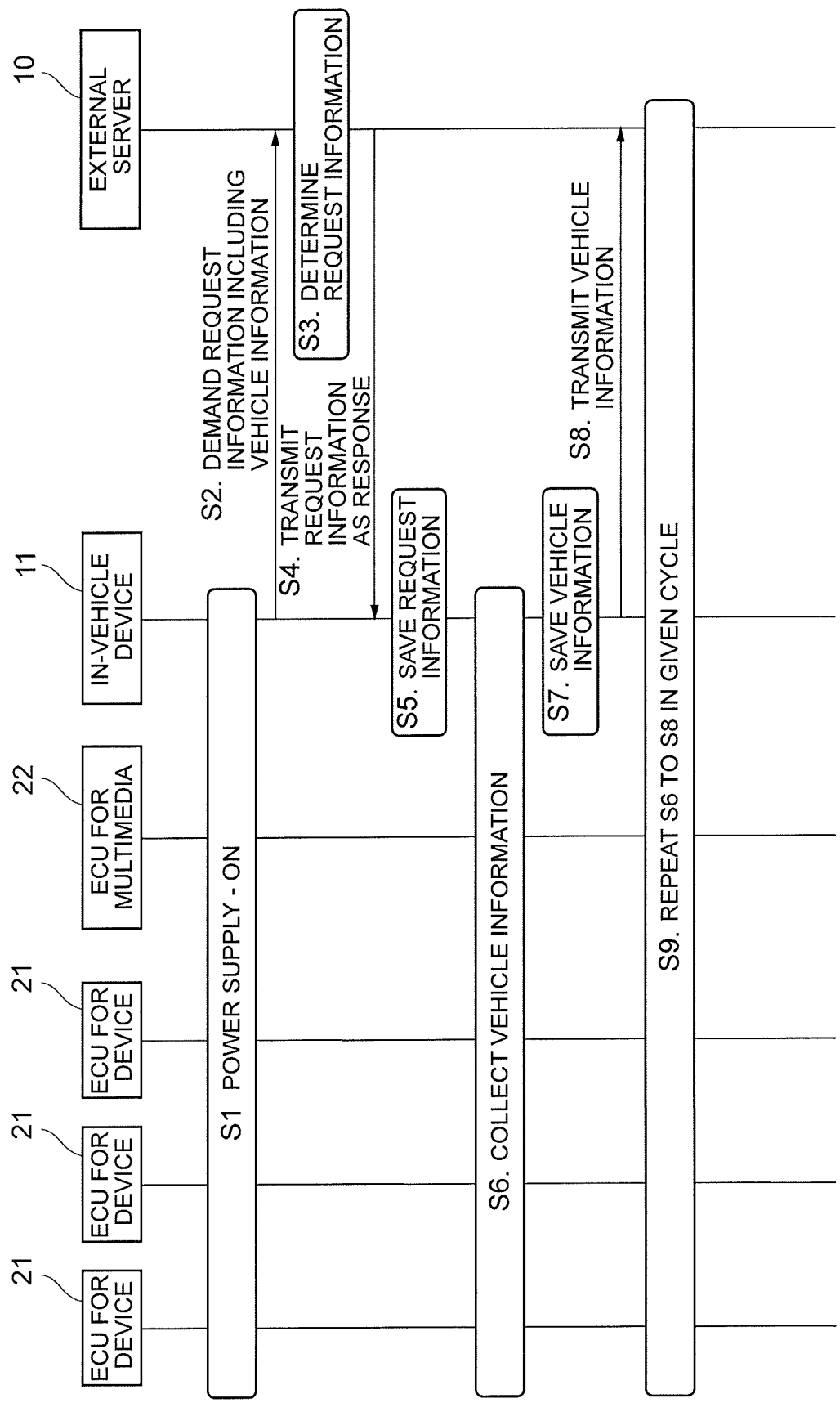

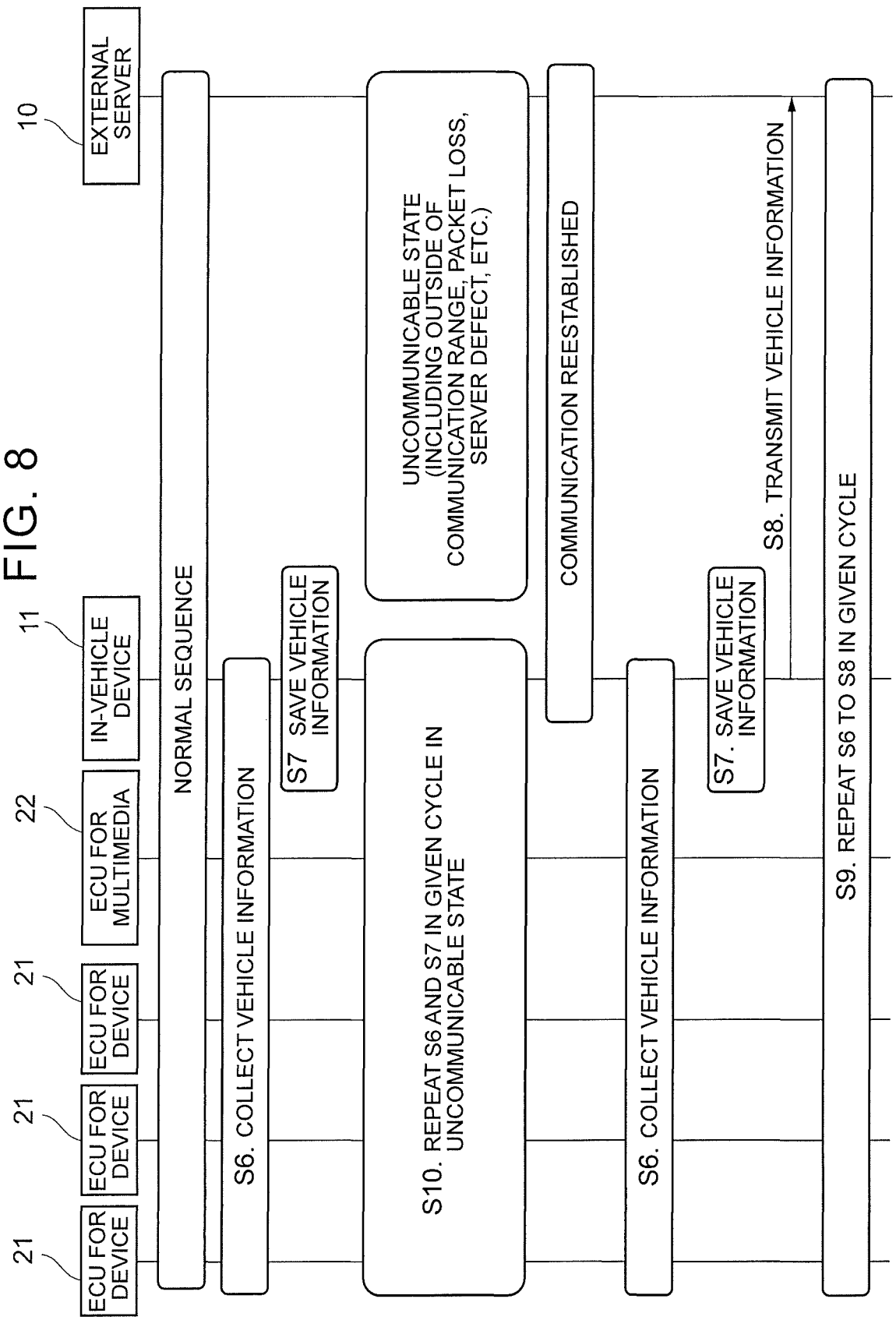

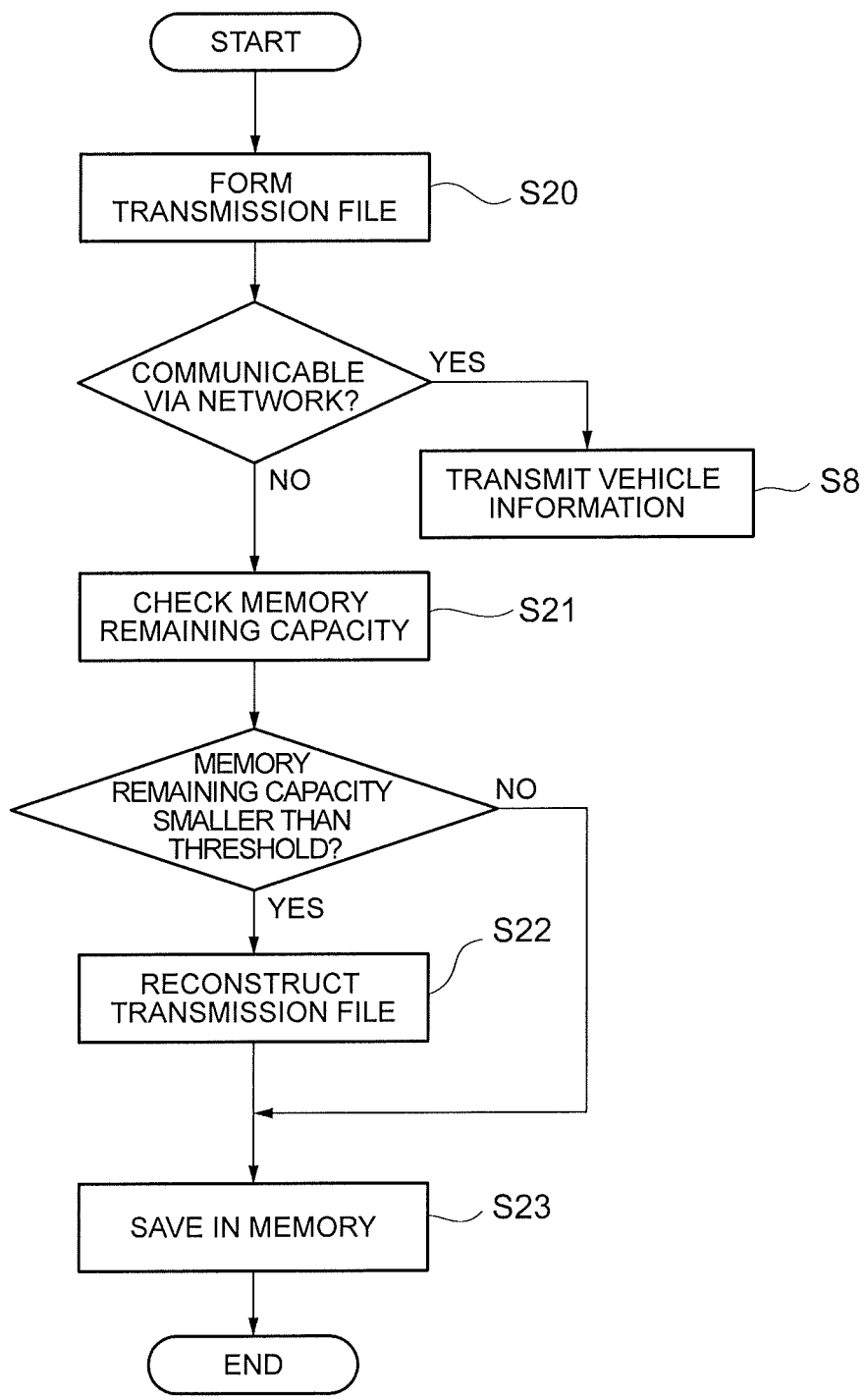

IN-VEHICLE DEVICE AND VEHICLE INFORMATION COLLECTION SYSTEM

INCORPORATION BY REFERENCE

The disclosure of Japanese Patent Application No. 2018-227362 filed on Dec. 4, 2018 including the specification, drawings and abstract is incorporated herein by reference in its entirety.

BACKGROUND

1. Technical Field

The disclosure relates to an in-vehicle device and a vehicle information collection system.

2. Description of Related Art

There is a system in which an in-vehicle device transmits pieces of vehicle information collected from various devices in a vehicle to an external server via a communication network.

For example, Japanese Unexamined Patent Application Publication No. 2017-007405 (JP 2017-007405 A) describes a vehicle information communication system in which vehicle information acquired by an information acquisition portion of an in-vehicle information device is transferred to a portable terminal via a communication interface, and the portable terminal transfers the vehicle information to a center device. In the vehicle information communication system, when a plurality of pieces of vehicle information is to be transferred to the portable terminal, the pieces of vehicle information are transferred to the portable terminal sequentially from vehicle information with a higher transmission priority. Further, Japanese Unexamined Patent Application Publication No. 2018-092472 (JP 2018-092472) describes a system in which an external server collects vehicle information of an in-vehicle device.

SUMMARY

In the meantime, in a case where an in-vehicle device transmits pieces of vehicle information collected from various devices in a vehicle to an external server via a communication network, when the communication network cannot establish communication and the pieces of vehicle information cannot be transmitted, it is necessary to accumulate the pieces of vehicle information in a memory in the in-vehicle device for a while. When the memory in the in-vehicle device is short of space, it is conceivable that old vehicle information is deleted, and new vehicle information is accumulated.

However, in such a case, as the number of pieces of vehicle information to be accumulated in the in-vehicle device increases, the number of pieces of vehicle information to be deleted without being transmitted to the external server increases. For example, in a case where a service to a vehicle is provided by use of vehicle information transmitted to the external server, an operation or a quality of the service may be affected by deletion of many pieces of vehicle information useful for the service.

The disclosure is accomplished in view of such a problem and one object of the disclosure is to provide an in-vehicle device and a vehicle information collection system each of which can transmit more pieces of vehicle information necessary for an external server to the external server.

An in-vehicle device according to one aspect of the disclosure includes: an information receiving portion configured to receive request information for an external server to request transmission of pieces of vehicle information via a communication network; an information collection portion configured to collect the pieces of vehicle information from devices in a vehicle based on the request information received by the information receiving portion; an information accumulation portion configured to accumulate, in a memory, the pieces of vehicle information collected by the information collection portion; and an information transmission portion configured to transmit the pieces of vehicle information accumulated in the memory to the external server. When a remaining capacity of the memory becomes smaller than a threshold, the information accumulation portion accumulates, in the memory, vehicle information with a high priority by removing vehicle information with a low priority from the pieces of vehicle information.

In the above aspect, the request information may include priority information about the pieces of vehicle information.

In the above aspect, the information accumulation portion may form, in the memory, a transmission file to transmit the pieces of vehicle information to the external server and accumulates the pieces of vehicle information in the transmission file. When the remaining capacity of the memory becomes less than the threshold, the information accumulation portion may reconstruct a transmission file in which vehicle information with a high priority is accumulated by removing vehicle information with a low priority.

In the above aspect, when the remaining capacity of the memory becomes smaller than the threshold, the information accumulation portion may perform any of the following processes: a first process of reconstructing a transmission file in which pieces of vehicle information that have been already accumulated and vehicle information with a high priority obtained by removing vehicle information with a low priority from pieces of vehicle information that are newly collected after that are accumulated; a second process of reconstructing a transmission file in which vehicle information with a high priority obtained by removing vehicle information with a low priority from pieces of vehicle information that have been already accumulated, and pieces of vehicle information that are newly collected after that are accumulated; and a third process of reconstructing a transmission file in which vehicle information with a high priority obtained by removing vehicle information with a low priority from pieces of vehicle information that have been already accumulated and pieces of vehicle information that are newly collected after that are accumulated.

In the above aspect, the information accumulation portion may select and perform any of the first process, the second process, and the third process.

In the above aspect, the request information may include selection information indicative of which process is selected from the first process, the second process, and the third process. The information accumulation portion may select any of the first process, the second process, and the third process based on the selection information.

A vehicle information collection system according to one aspect of the disclosure includes: an external server; and an in-vehicle device communicable with the external server via a communication network. The external server includes an information transmission portion configured to transmit request information to request the in-vehicle device to transmit pieces of vehicle information. The in-vehicle device includes: an information receiving portion configured to receive the request information from the external server;

an information collection portion configured to collect the pieces of vehicle information from devices in a vehicle based on the request information received by the information receiving portion; an information accumulation portion configured to accumulate, in a memory, the pieces of vehicle information collected by the information collection portion; and an information transmission portion configured to transmit the pieces of vehicle information accumulated in the memory to the external server. When a remaining capacity of the memory becomes smaller than a threshold, the information accumulation portion accumulates, in the memory, vehicle information with a high priority by removing vehicle information with a low priority from the pieces of vehicle information.

In the above aspect, the external server may include a database including priority information about the pieces of vehicle information. The information transmission portion of the external server may transmit request information including the priority information based on the database.

In the above aspect, the in-vehicle device may transmit, to the external server, information to demand the request information. When the information transmission portion of the external server receives, from the in-vehicle device, the information to demand the request information, the information transmission portion may transmit the request information.

In the above aspect, the information to demand the request information may include identification information of a vehicle. The external server may include: a database in which the identification information of the vehicle is associated with the request information, and a request information determination portion configured to determine the request information based on the database.

In the above aspect, the database in which the identification information of the vehicle is associated with the request information may include: a first table indicating a service corresponding to the identification information of the vehicle; and a second table indicating vehicle information corresponding to the service.

In the above aspect, the information accumulation portion may form, in the memory, a transmission file to transmit the pieces of vehicle information to the external server and accumulates the pieces of vehicle information in the transmission file. When the remaining capacity of the memory becomes less than the threshold, the information accumulation portion may reconstruct a transmission file in which vehicle information with a high priority is accumulated by deleting vehicle information with a low priority.

In the above aspect, when a remaining capacity of the memory becomes smaller than a threshold, the information accumulation portion may perform any one of the following processes: a first process of reconstructing a transmission file in which pieces of vehicle information that have been already accumulated and vehicle information with a high priority obtained by removing vehicle information with a low priority from pieces of vehicle information newly collected after that are accumulated; a second process of reconstructing a transmission file in which vehicle information with a high priority obtained by removing vehicle information with a low priority from pieces of vehicle information that have been already accumulated, and pieces of vehicle information that are newly collected after that are accumulated; and a third process of reconstructing a transmission file in which vehicle information with a high priority obtained by removing vehicle information with a low priority from pieces of vehicle information that have been already accumulated and pieces of vehicle information that are newly collected after that are accumulated.

In the above aspect, the information accumulation portion may select and perform any of the first process, the second process, and the third process.

In the above aspect, the request information may include selection information indicative of which process is selected from the first process, the second process, and the third process. The information accumulation portion may select any of the first process, the second process, and the third process based on the selection information.

With the disclosure, it is possible to transmit more pieces of vehicle information necessary for an external server from an in-vehicle device to the external server.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a view illustrating an example of a first table;

FIG. 5 is a view illustrating an example of a second table;

FIG. 6 is a view illustrating an example of a third table;

FIG. 7 is a view illustrating the sequence of vehicle information collection of the vehicle information collection system;

FIG. 8 is a view illustrating the sequence of vehicle information collection of the vehicle information collection system; and FIG. 9 is a view illustrating the sequence of saving of vehicle information.

DETAILED DESCRIPTION OF EMBODIMENTS

Hereinafter, an embodiment of the disclosure will be described in detail. Note that the following embodiment of the disclosure is an example to describe the disclosure and is not to limit the disclosure to the embodiment. Further, the disclosure can be modified variously without deviating from the gist of the disclosure.

Figure 1:
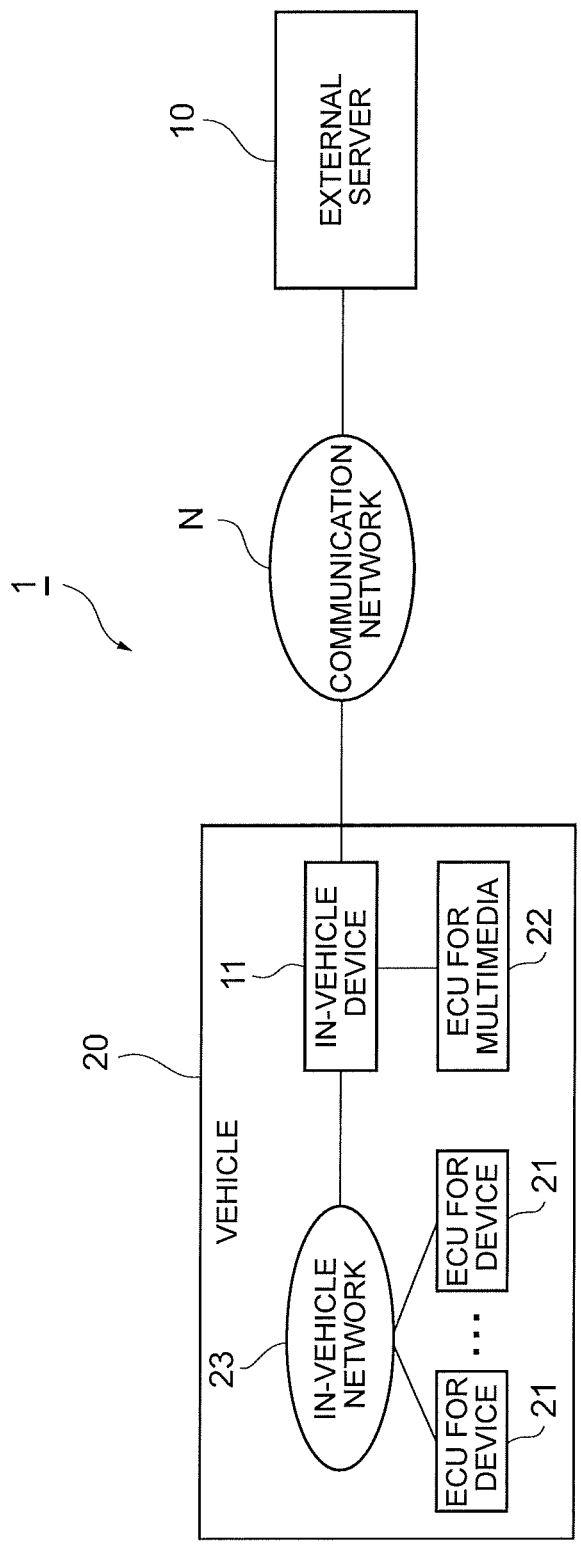
FIG. 1 is an explanatory view illustrating an outline of a configuration of a vehicle information collection system.

FIG. 1 illustrates an example of a configuration of a vehicle information collection system 1 according to the embodiment. As illustrated in FIG. 1, the vehicle information collection system 1 includes an external server 10 and an in-vehicle device 11. The external server 10 and the in-vehicle device 11 can communicate with each other via a communication network N.

The in-vehicle device 11 is provided in a vehicle 20, and the vehicle 20 includes various electronic control units (ECUs) 21 configured to collect pieces of information from various devices, an ECU 22 for multimedia, and so on. The devices from which the ECUs 21 collect the pieces of information include a motor, various measurement devices, accessories, and the like. The multimedia includes a car navigation device and the like. The in-vehicle device 11 is configured to be communicable with the various ECUs 21 and the ECU 22 for the multimedia via an in-vehicle network 23 or the like.

The external server 10 collects and manages vehicle information necessary to provide a service for the vehicle 20, for example, from the in-vehicle device 11 of the vehicle 20, for example. The vehicle information includes information based on which a driving or operation state of the vehicle 20 can be found, e.g., pieces of operation information and measurement information of the various ECUs 21 and the ECU 22 for the multimedia.

Figure 2:
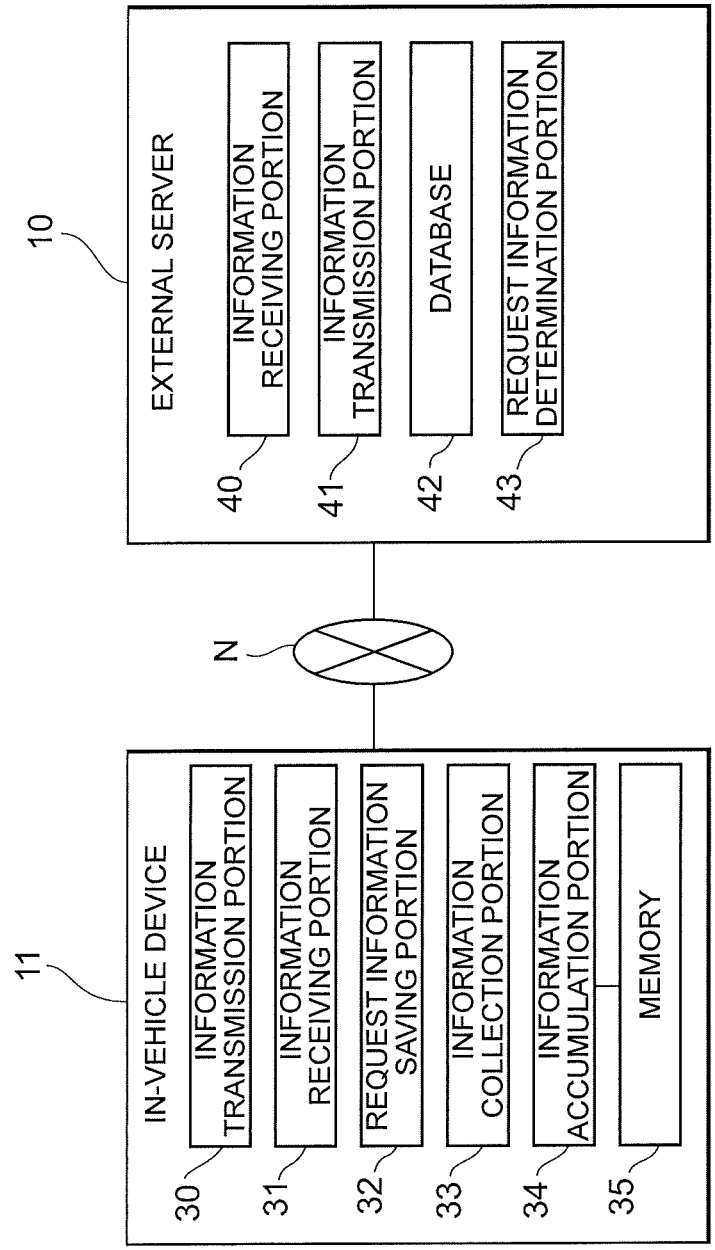
FIG. 2 is a block diagram illustrating configurations of an in-vehicle device and an external server.

As illustrated in FIG. 2, as functional constituents, the in-vehicle device 11 includes an information transmission portion 30, an information receiving portion 31, a request information saving portion 32, an information collection portion 33, an information accumulation portion 34, and so on. As physical constituents, the in-vehicle device 11 is constituted by a control unit including a central processing unit (CPU) and a memory, an operation portion, a display, a speaker, a storage unit, a communication device, and so on, for example. When the CPU executes predetermined programs stored in the memory, respective functions of the information transmission portion 30, the information receiving portion 31, the request information saving portion 32, the information collection portion 33, the information accumulation portion 34, and so on are implemented.

As functional constituents, the external server 10 includes, for example, an information receiving portion 40, an information transmission portion 41, a database (storage portion) 42, a request information determination portion 43, and so on. As physical constituents, the external server 10 is constituted by, for example, a control unit including a CPU and a memory, a storage unit, a communication unit, and so on. When the CPU executes predetermined programs stored in the memory, respective functions of the information receiving portion 40, the information transmission portion 41, the database 42, and the request information determination portion 43 are implemented.

The information transmission portion 30 of the in-vehicle device 11 transmits information to demand request information from the external server 10, the request information being information for the external server 10 to request transmission of vehicle information via the communication network N. The information to demand the request information includes identification information of a vehicle to specify the vehicle.

The information receiving portion 31 of the in-vehicle device 11 receives the request information by which the external server 10 requests transmission of vehicle information via the communication network N. The request information includes priority information about vehicle information (described later), selection information to reconstruct a transmission file, and so on as well as vehicle information to be collected.

The request information saving portion 32 saves, in the memory 35, the request information received by the information receiving portion 31.

The information collection portion 33 collects pieces of vehicle information from various devices such as the various ECUs 21 of the vehicle 20 and the ECU 22 for the multimedia based on the request information saved in the request information saving portion 32.

The information accumulation portion 34 accumulates, in the memory 35, pieces of vehicle information collected by the information collection portion 33. When a remaining capacity of the memory 35 becomes smaller than a predetermined threshold, the information accumulation portion 34 accumulates, in the memory 35, vehicle information with a high priority by removing vehicle information with a low priority from the pieces of vehicle information. At this time, the information accumulation portion 34 grasps priorities of the pieces of vehicle information based on the priority information indicative of which vehicle information should be prioritized, included in the request information received from the external server 10.

The information accumulation portion 34 forms, in the memory 35, a transmission file to transmit vehicle information to the external server 10 and accumulates the vehicle information in the transmission file.

When the remaining capacity of the memory 35 becomes smaller than the threshold, the information accumulation portion 34 reconstructs a transmission file in which vehicle information with a high priority is accumulated by removing vehicle information with a low priority, based on the priority information of the request information. The threshold of the remaining capacity of the memory 35 can be set appropriately but may be set to about 40% to 90% of a full capacity of the memory 35, for example. Further, the threshold of the remaining capacity of the memory 35 may be set on the in-vehicle device 11 side or may be set on the external server 10 side and transmitted to the in-vehicle device 11 from the external server 10.

Figure 3:
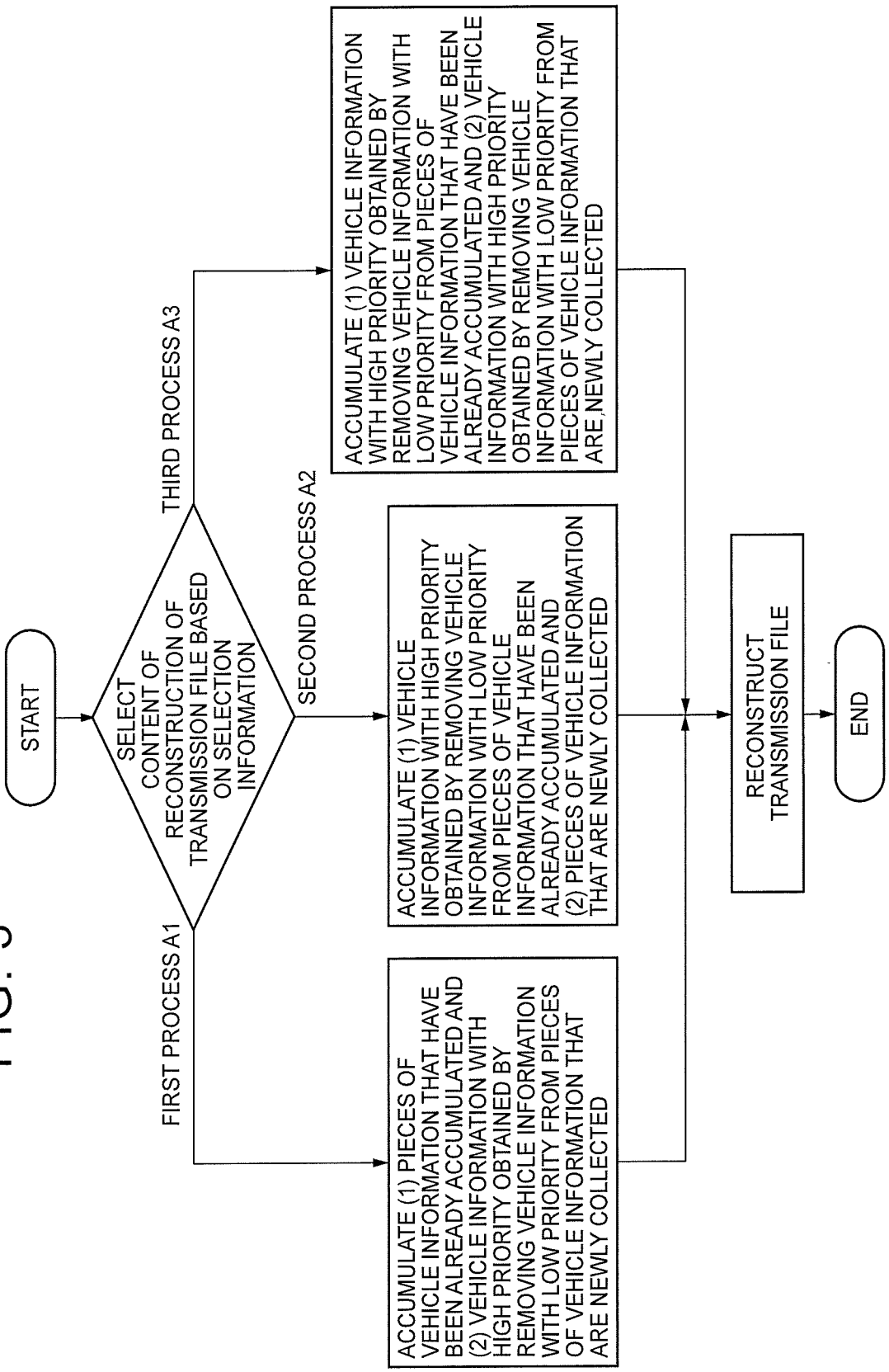
FIG. 3 is a view illustrating the flow of reconstruction of a transmission file.

The information accumulation portion 34 performs the reconstruction of the transmission file at the time when the remaining capacity of the memory 35 becomes smaller than the threshold, by selecting any of a first process A1, a second process A2, and a third process A3 as follows. FIG. 3 illustrates the flow of selecting a target for the reconstruction of the transmission file. The first process A1 is a process of, when the remaining capacity of the memory 35 becomes smaller than the threshold, reconstructing a transmission file in which pieces of vehicle information that have been already accumulated and vehicle information with a high priority obtained by removing vehicle information with a low priority from pieces of vehicle information that are newly collected after that are accumulated. The second process A2 is a process of, when the remaining capacity of the memory 35 becomes smaller than the threshold, reconstructing a transmission file in which vehicle information with a high priority obtained by removing vehicle information with a low priority from pieces of vehicle information that have been already accumulated, and pieces of vehicle information that are newly collected after that are accumulated. The third process A3 is a process of, when the remaining capacity of the memory 35 becomes smaller than the threshold, reconstructing a transmission file in which vehicle information with a high priority obtained by removing vehicle information with a low priority from pieces of vehicle information that have been already accumulated and pieces of vehicle information that are newly collected after that is accumulated.

The information accumulation portion 34 reconstructs a transmission file by selecting any of the first process A1, the second process A2, and the third process A3, based on the selection information indicative of which process is selected from the first process A1 to the third process A3, included in the request information received by the information receiving portion 31.

The information transmission portion 30 illustrated in FIG. 2 transmits pieces of vehicle information in the transmission file accumulated in the information accumulation portion 34 to the external server 10 via the communication network N.

The information receiving portion 40 of the external server 10 receives the information to demand the request information, transmitted by the in-vehicle device 11 via the communication network N.

The request information determination portion 43 determines request information based on the database 42 in which request information corresponding to the identification information of the vehicle is stored. More specifically, the request information determination portion 43 determines the request information by use of tables T1 to T3 in the database 42.

For example, a first table T1 indicative of whether a contract for a service to be provided is made or not for each identification number (identification numbers X, Y, Z . . . ) as identification information of a vehicle as illustrated in FIG. 4 and a second table T2 indicative of whether pieces of vehicle information (vehicle information 1, vehicle information 2, vehicle information 3 . . . ) are required or not for each service to be provided (a service A, a service B, a service C . . . ) as illustrated in FIG. 5 are stored in the database 42.

Further, a third table T3 indicative of a target for reconstruction of a transmission file for each identification number (identification numbers X, Y, Z . . . ) of a vehicle is stored in the database 42 as illustrated in FIG. 6. In the table T3, the target for reconstruction of a transmission file is any of the first process A1, the second process A2, and the third process A3.

The request information determination portion 43 determines vehicle information and priority information for the request information by use of the identification number of the vehicle and the first table T1 and the second table T2 in the database 42. More specifically, in a case of the vehicle with the identification number X, for example, from the first table T1 illustrated in FIG. 4, the vehicle is under contract for the services A, B, and from the second table T2 illustrated in FIG. 5, vehicle information necessary to receive the services A, B is the vehicle information 1, the vehicle information 2, and the vehicle information 3. Accordingly, the vehicle information for the request information to the vehicle with the identification number X is the vehicle information 1, the vehicle information 2, and the vehicle information 3. Further, the vehicle information 2 is necessary for the services A, B, and therefore, the priority of the vehicle information 2 is high, whereas the priorities of the vehicle information 1 and the vehicle information 3 are low. This is the priority information for the request information to the vehicle with the identification number X.

The request information determination portion 43 determines selection information for the request information by use of the identification number of the vehicle and the third table T3 in the database 42. More specifically, from the third table T3 illustrated in FIG. 6, in a case of the vehicle with the identification number X, for example, the target for reconstruction of a transmission file is the first process A1, and this is the selection information to the vehicle with the identification number X.

The information transmission portion 41 transmits the request information determined by the request information determination portion 43 to the in-vehicle device 11.

The information receiving portion 40 receives vehicle information transmitted by the in-vehicle device 11 via the communication network N.

Next will be described an example of the operation of the vehicle information collection system 1. FIGS. 7 and 8 are views illustrating the sequence of vehicle information collection of the vehicle information collection system 1.

As illustrated in FIG. 7, first, when a power supply is turned on (step S1), the information transmission portion 30 of the in-vehicle device 11 of the vehicle 20 transmits, to the external server 10 via the communication network N, information to demand request information (step S2). The information to demand request information includes identification information of the vehicle 20, e.g., the identification number X. The information receiving portion 40 of the external server 10 receives the information to demand request information.

When the information receiving portion 40 of the external server 10 receives the information to demand request information, the request information determination portion 43 determines request information based on the identification information of the vehicle and the tables T1 to T3 in the database 42 (step S3). More specifically, by use of the first table T1 and the second table T2 illustrated in FIGS. 4 and 5, the services A, B to be provided are specified based on the identification number X of the vehicle, and the vehicle information 1, the vehicle information 2, and the vehicle information 3 are determined as vehicle information necessary to receive the services A, B. At this time, for example, the vehicle information 2 is necessary for the services A, B, and therefore, the vehicle information 2 is set to vehicle information with a high priority, whereas the vehicle information 1 and the vehicle information 3 are set to vehicle information with a low priority. Thus, priority information is determined.

Further, by use of the third table T3 in the database 42 illustrated in FIG. 6, the first process A1 is determined as the target for reconstruction of a transmission file is determined based on the identification number X of the vehicle. Thus, selection information is determined.

As illustrated in FIG. 7, subsequently, the information transmission portion 41 of the external server 10 transmits, to the in-vehicle device 11, the request information including the vehicle information, the priority information, and the selection information, determined by the request information determination portion 43, as a response (step S4).

The information receiving portion 31 of the in-vehicle device 11 receives the request information from the external server 10, and the request information saving portion 32 saves the request information in the memory (step S5).

Then, the information collection portion 33 collects pieces of vehicle information from various devices such as the various ECUs 21 of the vehicle 20 and the ECU 22 for the multimedia based on the request information received by the information receiving portion 31. More specifically, the vehicle information 1, the vehicle information 2, and the vehicle information 3 are collected (step S6).

The information accumulation portion 34 accumulates and saves, in the memory 35, the vehicle information 1, the vehicle information 2, and the vehicle information 3 collected by the information collection portion 33 (step S7). At this time, the information accumulation portion 34 forms a transmission file in the memory 35 and accumulates the vehicle information 1, the vehicle information 2, and the vehicle information 3 in the transmission file. Subsequently, the information transmission portion 30 transmits the vehicle information 1, the vehicle information 2, and the vehicle information 3 in the transmission file to the external server 10 via the communication network N (step S8). The information receiving portion 40 of the external server 10 receives and saves the vehicle information 1, the vehicle information 2, and the vehicle information 3. Steps S6 to S8 are performed repeatedly in a given cycle (step S9).

As illustrated in FIG. 8, the communication network N might not be able to establish communication due to outside of a communication range, a packet loss, a server defect, and the like in some cases. In view of this, when the information accumulation portion 34 accumulates and save vehicle information (step S7), the sequence illustrated in FIG. 9 is performed.

In the sequence of saving vehicle information, a transmission file is formed first (step S20). When the communication network N can establish communication, pieces of vehicle information accumulated in the transmission file are transmitted to the external server 10 as described above (step S8). When the communication network N cannot establish communication, the remaining capacity of the memory 35 is checked (step S21). When the remaining capacity of the memory 35 is a threshold or more, the pieces of vehicle information are just saved in the transmission file of the memory 35 (step S23). When the remaining capacity of the memory 35 is smaller than the threshold, a transmission file is reconstructed (step S22), and corresponding pieces of vehicle information are saved (step S23).

In the reconstruction (step S22) of the transmission file, any of the first process A1, the second process A2, and the third process A3 is performed based on the selection information as illustrated in FIG. 3. In a case where the first process A1 is selected, when the remaining capacity of the memory 35 becomes smaller than the threshold, a transmission file in which pieces of vehicle information that have been already accumulated and vehicle information with a high priority from among pieces of vehicle information collected after that are accumulated is reconstructed. That is, the vehicle information 1, the vehicle information 2, and the vehicle information 3 that have been already accumulated are left as they are, and among the vehicle information 1, the vehicle information 2, and the vehicle information 3 that are newly collected, the vehicle information 1 and the vehicle information 3 with a low priority are deleted, and the vehicle information 2 with a high priority is accumulated. In the selection information for the vehicle with the identification number X, the first process A1 is selected, and therefore, the first process A1 is executed.

In a case where the second process A2 is selected, when the remaining capacity of the memory 35 becomes smaller than the threshold, a transmission file in which vehicle information obtained by deleting vehicle information with a low priority from pieces of vehicle information that have been already accumulated, and pieces of vehicle information that are newly collected after that are accumulated is reconstructed. That is, only the vehicle information 2 with a high priority is left by deleting the vehicle information 1 and the vehicle information 3 with a low priority from the vehicle information 1, the vehicle information 2, and the vehicle information 3 that have been already accumulated, while the vehicle information 1, the vehicle information 2, and the vehicle information 3 that are newly collected are left as they are. Then, those pieces of information are accumulated.

In a case where the third process A3 is selected, when the remaining capacity of the memory 35 becomes smaller than the threshold, a transmission file in which pieces of vehicle information with a high priority, obtained by deleting pieces of vehicle information with a low priority from pieces of vehicle information that have been already accumulated and pieces of vehicle information collected after that, is accumulated is reconstructed. That is, the vehicle information 2 with a high priority is left by deleting the vehicle information 1 and the vehicle information 3 with a low priority from the vehicle information 1, the vehicle information 2, and the vehicle information 3 that have been already accumulated, while the vehicle information 2 with a high priority is left by deleting the vehicle information 1 and the vehicle information 3 with a low priority from the vehicle information 1, the vehicle information 2, and the vehicle information 3 that are newly collected. Then, those pieces of information thus left are accumulated.

As illustrated in FIG. 8, when the communication network N cannot establish communication, a vehicle information collection step S6 and a vehicle information saving step S7 are repeated in a given cycle (step S10). After the communication via the communication network N is reestablished, pieces of vehicle information are collected (step S6), the pieces of vehicle information are saved in a transmission file (step S7), and the pieces of vehicle information in the transmission file are transmitted to the external server 10 (step S8). Then, the vehicle information collection step S6, the vehicle information saving step S7, and a vehicle information transmission step S8 are repeated in a given cycle (step S9).

With the present embodiment, when the remaining capacity of the memory 35 becomes smaller than the threshold, the information accumulation portion 34 accumulates, in the memory, vehicle information with a high priority by removing vehicle information with a low priority. Hereby, for example, in a case where many pieces of vehicle information are accumulated in the memory 35 and the remaining capacity of the memory 35 becomes small, e.g., in a case where the communication network N cannot establish communication, useful vehicle information can be accumulated preferentially. As a result, it is possible to transmit more pieces of useful vehicle information to the external server 10. Accordingly, it is possible for the external server 10, for example, to collect more pieces of vehicle information required for a service to the vehicle. As a result, even when the number of pieces of vehicle information to be collected increases, it is possible to restrain the operation or the quality of the service from being affected, for example.

The external server 10 includes the database 42 including priority information about vehicle information, and the information transmission portion 41 of the external server 10 transmits request information including the priority information based on the database 42. Thus, the external server 10 has the priority information, so that a burden to the in-vehicle device 11 is reduced.

The in-vehicle device 11 transmits, to the external server 10, the information to demand request information, and when the information transmission portion 41 of the external server 10 receives the information to demand request information from the in-vehicle device 11, the information transmission portion 41 transmits the request information. Hereby, the in-vehicle device 11 requests the external server 10 to transmit the request information when the communication is performable, so that the transmission of the request information from the external server 10 to the in-vehicle device 11 can be performed surely.

The external server 10 includes the database 42 in which identification information of a vehicle is associated with request information, and the request information determination portion 43 configured to determine request information based on the database 42. Hereby, the external server 10 can determine request information corresponding to each vehicle and transmit it to the in-vehicle device 11, thereby making it possible to improve a service to the vehicle, for example.

The database 42 includes the first table T1 indicative of a service corresponding to identification information of a vehicle, and the second table T2 indicative of vehicle information corresponding to a service. Accordingly, it is possible for the external server 10 to suitably collect vehicle information required to improve a service to each vehicle.

The information accumulation portion 34 forms, in the memory 35, a transmission file to transmit vehicle information to the external server 10 and accumulates the vehicle information in the transmission file. When the remaining capacity of the memory 35 becomes less than the threshold, the information accumulation portion 34 reconstructs a transmission file in which vehicle information with a high priority is accumulated by removing vehicle information with a low priority. Hereby, it is possible to appropriately transmit pieces of vehicle information to the external server 10 by reducing the number of pieces of accumulated information.

When the remaining capacity of the memory 35 becomes smaller than the threshold, the information accumulation portion 34 performs any of the first process A1, the second process A2, and the third process A3. Accordingly, it is possible to suitably reconstruct a transmission file.

The information accumulation portion 34 selects and performs any of the first process A1, the second process A2, and the third process A3. Hereby, it is possible to reconstruct a transmission file in a way suitable for each vehicle.

The request information includes selection information indicative of which process is selected from the first process A1, the second process A2, and the third process A3, and the information accumulation portion 34 selects any of the first process A1, the second process A2, and the third process A3 based on the selection information. Hereby, it is possible to determine a method of reconstructing a transmission file based on an instruction on the external server 10 side.

In the above embodiment, any one of the first process to the third process is selected at the time of reconstructing a transmission file, but two or three processes may be selected from them.

Note that the disclosure is not limited to the above embodiment, and the disclosure can be performed in other various forms within a range that does not deviate from the gist of the disclosure. Accordingly, the embodiment is just an example in every respect and must not be interpreted restrictively. For example, the processing steps described above can be executed by changing the order of the processing steps optionally within a range that is not inconsistent with the process content, or the processing steps described above can be executed in parallel to each other.

Further, the constituents of the in-vehicle device 11 and the external server 10 are not limited to the constituents described in the above embodiment, and a given constituent can be added appropriately as necessary.

Note that, in the above embodiment, the external server 10 is constituted by one device, but the external server 10 may be configured by providing the functional constituents (the information receiving portion 40, the information transmission portion 41, the database (storage portion) 42, and the request information determination portion 43) included in the external server in a plurality of devices in a dispersed manner.

The disclosure is useful when an in-vehicle device and a vehicle information collection system each of which can transmit, to an external server, more pieces of vehicle information necessary for the external server are provided.

What is claimed is:

1. An in-vehicle device comprising:
  processing circuitry configured to:
    receive request information from an external server to request transmission of pieces of vehicle information via a communication network;
    collect the pieces of vehicle information from devices in a vehicle based on the received request information;
    accumulate, in a non-transitory memory, the collected pieces of vehicle information; and
    transmit the pieces of vehicle information accumulated in the memory to the external server, wherein, when a remaining capacity of the memory becomes smaller than a threshold, the processing circuitry is further configured to accumulate, in the memory, vehicle information with a high priority by removing vehicle information with a low priority from the pieces of vehicle information,
  wherein the in-vehicle device transmits, to the external server, information to demand the request information, and when the external server receives, from the in-vehicle device, the information to demand the request information, the external server is configured to transmit the request information.

2. The in-vehicle device according to claim 1, wherein the request information includes priority information about the pieces of vehicle information.

3. The in-vehicle device according to claim 1, wherein the processing circuitry is further configured to:
  form, in the memory, a transmission file to transmit the pieces of vehicle information to the external server and accumulates the pieces of vehicle information in the transmission file; and
  when the remaining capacity of the memory becomes less than the threshold, the processing circuitry is further configured to reconstruct the transmission file in which vehicle information with a high priority is accumulated by removing vehicle information with a low priority.

4. The in-vehicle device according to claim 3, wherein, when the remaining capacity of the memory becomes smaller than the threshold, the processing circuitry is further configured to perform any of the following processes:
  a first process of reconstructing the transmission file in which pieces of vehicle information that have been already accumulated and vehicle information with a high priority obtained by removing vehicle information with a low priority from pieces of vehicle information that are newly collected;
  a second process of reconstructing the transmission file in which vehicle information with a high priority obtained by removing vehicle information with a low priority from pieces of vehicle information that have been already accumulated, and pieces of vehicle information that are newly collected; and
  a third process of reconstructing the transmission file in which vehicle information with a high priority obtained by removing vehicle information with a low priority from pieces of vehicle information that have been already accumulated and pieces of vehicle information that are newly collected.

5. The in-vehicle device according to claim 4, wherein the processing circuitry is further configured to select and perform any of the first process, the second process, and the third process.

6. The in-vehicle device according to claim 5, wherein:
  the request information includes selection information indicative of which process is selected from the first process, the second process, and the third process; and
  the processing circuitry is further configured to select any of the first process, the second process, and the third process based on the selection information.

7. A vehicle information collection system comprising:
an external server; and
an in-vehicle device communicable with the external server via a communication network, wherein:
the external server includes first processing circuitry configured to transmit request information to request the in-vehicle device to transmit pieces of vehicle information;
the in-vehicle device includes second processing circuitry configured to:
receive e request information from the external server,
collect the pieces of vehicle information from devices in a vehicle based on the received request information,
accumulate, in a non-transitory memory, the collected pieces of vehicle information, and
transmit the accumulated pieces of vehicle information; and
when a remaining capacity of the memory becomes smaller than a threshold, the second processing circuitry is further configured to accumulate, in the memory, vehicle information with a high priority by removing vehicle information with a low priority from the pieces of vehicle information,
wherein second processing circuitry of the in-vehicle device transmits, to the external server, information to demand the request information, and when the first processing circuitry of the external server receives, from the in-vehicle device, the information to demand the request information, the first processing circuitry is further configured to transmit the request information.

8. The vehicle information collection system according to claim 7, wherein:
the external server includes a database including priority information about the pieces of vehicle information; and
the first processing circuitry of the external server is further configured to transmit request information including the priority information based on the database.

9. The vehicle information collection system according to claim 7, wherein:
the information to demand the request information includes identification information of a vehicle; and
the external server includes
a database in which the identification information of the vehicle is associated with the request information, and
the first processing circuitry is further determine the request information based on the database.

10. The vehicle information collection system according to claim 9, wherein the database in which the identification information of the vehicle is associated with the request information includes a first table indicating a service corresponding to the identification information of the vehicle, and
a second table indicating vehicle information corresponding to the service.

11. The vehicle information collection system according to claim 7, wherein:
the second processing circuitry is further configured to form, in the memory, a transmission file to transmit the pieces of vehicle information to the external server and accumulates the pieces of vehicle information in the transmission file; and
when the remaining capacity of the memory becomes less than the threshold, the second processing circuitry is further configured to reconstruct a transmission file in which vehicle information with a high priority is accumulated by deleting vehicle information with a low priority.

12. The vehicle information collection system according to claim 11, wherein, when a remaining capacity of the memory becomes smaller than a threshold, the second processing circuitry is further configured to perform any one of the following processes:
a first process of reconstructing a transmission file in which pieces of vehicle information that have been already accumulated and vehicle information with a high priority obtained by removing vehicle information with a low priority from pieces of vehicle information newly collected;
a second process of reconstructing a transmission file in which vehicle information with a high priority obtained by removing vehicle information with a low priority from pieces of vehicle information that have been already accumulated, and pieces of vehicle information that are newly collected; and
a third process of reconstructing a transmission file in which vehicle information with a high priority obtained by removing vehicle information with a low priority from pieces of vehicle information that have been already accumulated and pieces of vehicle information that are newly collected.

13. The vehicle information collection system according to claim 12, wherein the second processing circuitry is further configured to select and perform any of the first process, the second process, and the third process.

14. The vehicle information collection system according to claim 13, wherein:
the request information includes selection information indicative of which process is selected from the first process, the second process, and the third process; and
the second processing circuitry is further configured to select any of the first process, the second process, and the third process based on the selection information.

* * * * *